(12) United States Patent
Nakada

(10) Patent No.: US 11,546,501 B2
(45) Date of Patent: Jan. 3, 2023

(54) COMMUNICATION APPARATUS, CONTROL METHOD AND STORAGE MEDIUM

(71) Applicant: CANON KABUSHIKI KAISHA, Tokyo (JP)

(72) Inventor: Nobuhiro Nakada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 265 days.

(21) Appl. No.: 16/906,963

(22) Filed: Jun. 19, 2020

(65) Prior Publication Data

US 2020/0412963 A1    Dec. 31, 2020

(30) Foreign Application Priority Data

Jun. 27, 2019 (JP) .............. JP2019-120045

(51) Int. Cl.

| H04N 5/232 | (2006.01) |
|---|---|
| H04N 5/235 | (2006.01) |
| H04N 5/353 | (2011.01) |
| H04W 76/14 | (2018.01) |
| H04N 3/00 | (2006.01) |

(52) U.S. Cl.
CPC ......... *H04N 5/232061* (2018.08); *H04N 3/00* (2013.01); *H04N 5/2353* (2013.01); *H04N 5/2355* (2013.01); *H04N 5/3532* (2013.01); *H04W 76/14* (2018.02)

(58) Field of Classification Search
CPC ....... H04N 5/23227; H04N 2201/0055; H04N 2201/006; H04R 3/00; H04R 1/028; H04R 1/1041; H04R 2499/11; G06F 3/165; G06F 1/1698; G06F 2213/3814; G06F 3/1683

USPC .......................................................... 381/107
See application file for complete search history.

(56) References Cited

U.S. PATENT DOCUMENTS

| 2011/0182441 A1* | 7/2011 | Coffman ................. G06F 3/165 381/107 |
|---|---|---|
| 2020/0264834 A1* | 8/2020 | Mori ....................... H04R 1/028 |

FOREIGN PATENT DOCUMENTS

| CN | 106445453 A | 2/2017 |
|---|---|---|
| JP | 2005-184485 A | 7/2005 |
| JP | 2019-68112 A | 4/2019 |

* cited by examiner

*Primary Examiner* — Xi Wang
(74) *Attorney, Agent, or Firm* — Canon U.S.A., Inc. IP Division (57) ABSTRACT

A communication apparatus includes a wireless communication unit configured to wirelessly communicate with an external apparatus, a speaker, a memory, and a control unit, wherein in a case where an operation is executed to change the communication apparatus to a predetermined mode in which a sound is not output from the speaker, the control unit performs control such that the communication apparatus is changed to the predetermined mode, wherein in a case where identification information about the external apparatus is stored in the memory, the control unit enables a wireless communication function in response to the execution of the operation to change the communication apparatus to the predetermined mode, and wherein in a case where the identification information about the external apparatus is not stored in the memory, even if the operation to change the communication apparatus to the predetermined mode is executed, the wireless communication function is not enabled.

17 Claims, 7 Drawing Sheets

| SETTING | |
|---|---|
| 200 — SHUTTER MODE | ELECTRONIC |
| 210 — ELECTRONIC SOUND | ON |
| 220 — SILENT MODE | OFF |

FIG.2B

| SETTING | |
|---|---|
| SHUTTER MODE | MECHANICAL — 201 |
|  | ELECTRONIC — 202 |

FIG.2C

| SETTING | |
|---|---|
|  | ON — 211 |
| ELECTRONIC SOUND | SHUTTER ONLY — 212 |
|  | OFF — 213 |

FIG.2D

| SETTING | |
|---|---|
|  | ON — 221 |
| SILENT MODE | OFF — 222 |

FIG.3A

| | | |
|---|---|---|
| | SETTING | |
| 200 — | SHUTTER MODE | ELECTRONIC |
| 210 — | ELECTRONIC SOUND | OFF |
| 220 — | SILENT MODE | ON |

FIG.3B

| | | |
|---|---|---|
| | SETTING | |
| 200 — | SHUTTER MODE | ELECTRONIC |
| 210 — | ELECTRONIC SOUND | ON |
| 220 — | SILENT MODE | ON |

COMMUNICATION APPARATUS, CONTROL METHOD AND STORAGE MEDIUM

BACKGROUND

Field

The present disclosure relates to communication apparatuses that include a speaker.

Description of the Related Art

In recent years, communication apparatuses, such as, digital cameras or smartphones have included a speaker, and an electronic sound such as an operation sound or a warning sound can be output from the speaker. However, when, for example, a user uses a smartphone in a museum or during a concert, an electronic sound that is output from a speaker of the smartphone can become unwanted or intrusive sound for people around the user. Thus, some known communication apparatuses, such as, smartphones and digital cameras include a silent mode function in which the communication apparatus is controlled not to output an electronic sound from its speaker.

However, although the silent mode function is engaged, if a headphone is connected, the smartphone can output an electronic sound from the headphone. Therefore, a user can listen to the electronic sound of the smartphone through the headphone without bothering people in the vicinity. Japanese Patent Application Laid-Open No. 2019-68112 discusses a technique in which a smartphone and a headphone are wirelessly connected.

In a situation where a silent mode function is required, a user probably wishes to operate a smartphone in the silent mode function as soon as possible in order not to bother people in the area. Meanwhile, the user may wish to continue to listen to a sound such as an electronic shutter sound. In this case, the user first operates the smartphone so that the smartphone operates in the silent mode to not output a sound, and thereafter the user operates a menu of a wireless communication function of the smartphone to wirelessly connect the headphone. For example, in this case, the operation to change the smartphone to the silent mode and the operation to wirelessly connect the headphone are required.

SUMMARY

According to an aspect of the embodiments, a communication apparatus includes a wireless communication unit configured to wirelessly communicate with an external apparatus, a speaker, a memory, and a control unit, wherein in a case where an operation is executed to change the communication apparatus to a predetermined mode in which a sound is not output from the speaker, the control unit is configured to perform control such that the communication apparatus is changed to the predetermined mode, wherein in a case where identification information about the external apparatus is stored in the memory, the control unit is configured to enable a wireless communication function in response to the execution of the operation to change the communication apparatus to the predetermined mode, and wherein in a case where the identification information about the external apparatus is not stored in the memory, even if the operation to change the communication apparatus to the predetermined mode is executed, the control unit is configured not to enable the wireless communication function.

According to an aspect of the embodiments, a communication apparatus includes a wireless communication unit configured to wirelessly communicate with an external apparatus, a speaker, and a control unit, wherein the control unit is configured to enable a wireless communication function in response to execution of an operation to change to a predetermined mode in which a sound is not output from the speaker, wherein in a case where the wireless communication function is enabled in response to the execution of the operation to change to the predetermined mode, the control unit is configured to control the wireless communication unit such that a wireless connection is established between the communication apparatus and the external apparatus, and wherein in a case where the control unit determines that a wireless connection is not established between the communication apparatus and the external apparatus, the control unit is configured to disable the wireless communication function enabled in response to the execution of the operation to change to the predetermined mode.

Further features of the present invention will become apparent from the following description of exemplary embodiments with reference to the attached drawings.

DESCRIPTION OF THE EMBODIMENTS

Various exemplary embodiments of the present disclosure will be described in detail below with reference to the attached drawings. Each exemplary embodiment described below is a mere example of implementation of the present disclosure and may be modified or changed as needed depending on a configuration of an apparatus to which the present disclosure is applied and various conditions. Further, the exemplary embodiments can be combined as needed.

<Configuration of Digital Camera 100>

Figure 1A:
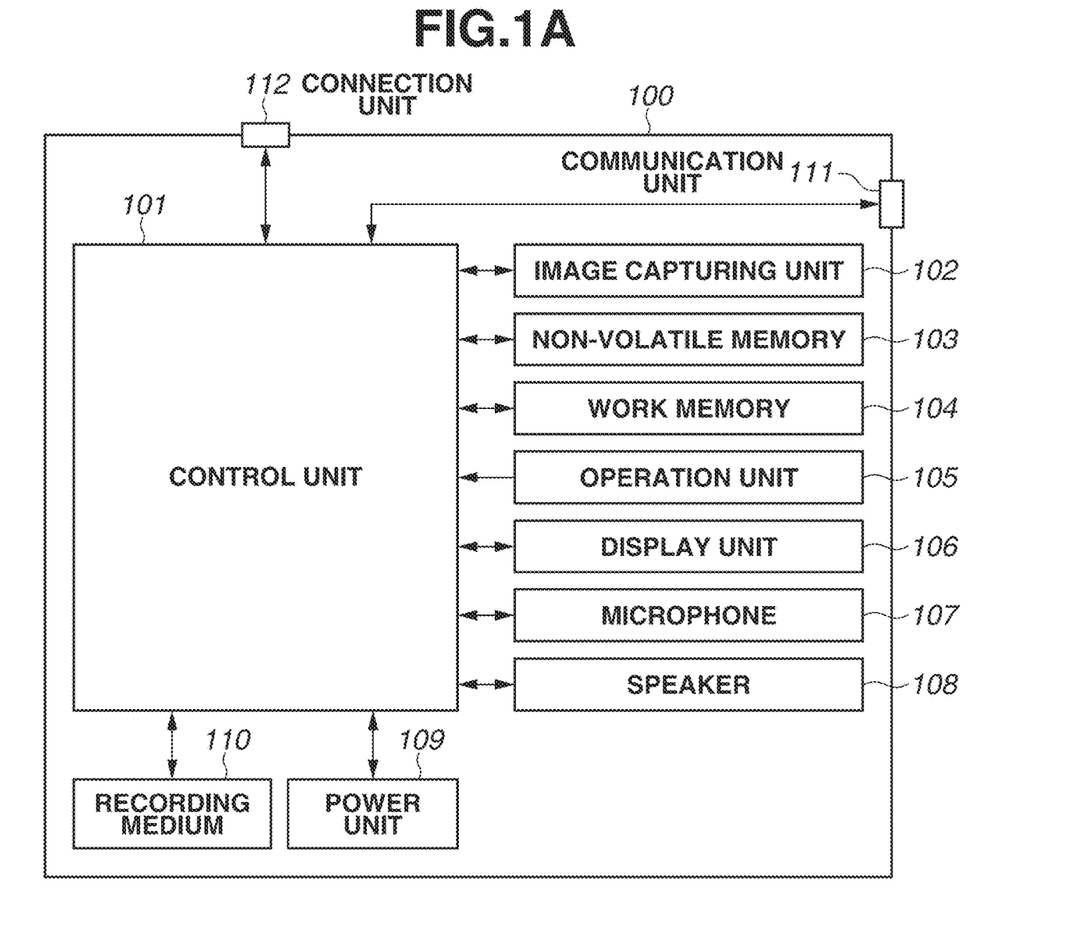
FIG. 1A is a block diagram illustrating an example of a configuration of a digital camera according to a first exemplary embodiment.
Figure 1B:
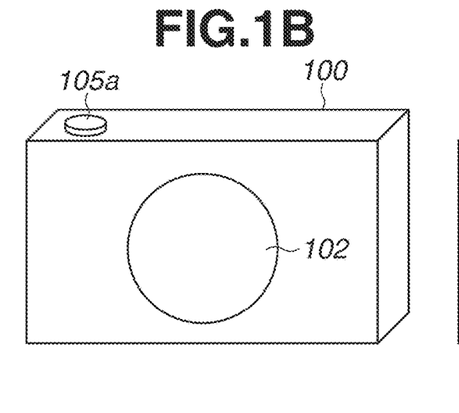
FIG. 1B illustrates an example of an external view of a front side of the digital camera according to the first exemplary embodiment.
Figure 1C:
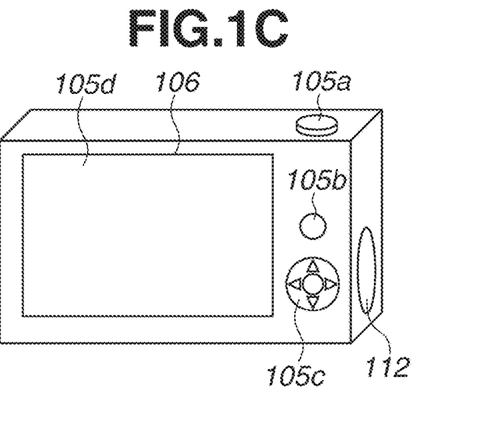
FIG. 1C illustrates an example of an external view of a rear side of the digital camera according to the first exemplary embodiment.

FIGS. 1A, 1B, and 1C are block diagrams illustrating an example of a digital camera 100 as an example of a communication apparatus according to a first exemplary embodiment. While the digital camera is described herein as an example of the communication apparatus, the communication apparatus is not limited to the digital camera. For example, the communication apparatus can be a smartphone, a personal computer, or a tablet terminal. The communication apparatus according to the present exemplary embodiment is an apparatus that includes a speaker and is capable of connecting to an external speaker, such as a headphone, similar to the above-described device.

A control unit 101 controls each component of the digital camera 100 based on an input signal and a program described below. The control unit 101 converts audio data recorded in a non-volatile memory 103 and a recording medium 110, which will be described below, into an audio signal and outputs the audio signal via a speaker 108, a communication unit 111, and a connection unit 112. Instead of the control unit 101, a plurality of pieces of hardware can control the entire apparatus by sharing the processing.

An image capturing unit 102 includes, for example, an optical system, and an image sensor. The optical system controls an optical lens unit, an aperture, zoom, and focus. The image sensor converts light (video image) having entered through the optical lens unit into an electric video signal. A complementary metal oxide semiconductor (CMOS) image sensor or a charge coupled device (CCD) image sensor is generally used as the image sensor. The image capturing unit 102 is controlled by the control unit 101 to convert subject light focused by a lens of the image capturing unit 102 into an electric signal with the image sensor, reduce noise, and output digital data as image data or moving image data. Further, the image capturing unit 102 includes a shutter that freely controls the exposure time of the image sensor under control by the control unit 101. The shutter is, for example, a focal plane shutter or a lens shutter. In the present exemplary embodiment, a series of processing of capturing the image data and outputting the captured image data will be referred to as "image capturing". The digital camera 100 according to the present exemplary embodiment records image data and moving image data in the recording medium 110, which will be described below, according to the Design rule for Camera File system (DCF) specification.

The non-volatile memory 103 is an electrically erasable/recordable non-volatile memory, and a below-described program that is to be executed by the control unit 101 is stored in the non-volatile memory 103. Further, audio data is recorded in the non-volatile memory 103. The audio data is, for example, data on electronic sounds, such as a focus sound that is output when a subject is brought into focus, an electronic shutter sound that is output when an image is captured, and an operation sound that is output when the digital camera 100 is operated. In the present exemplary embodiment, the electronic shutter sound is an imitative sound similar to an opening/closing sound of the shutter of the image capturing unit 102. The electronic shutter sound can be any sound from which a user can recognize that an image is captured. Thus, the electronic shutter sound can be significantly different in timbre and/or length from a real opening/closing sound of the shutter. In the present exemplary embodiment, the audio data is recorded in pulse-code modulation (PCM) or Motion Pictures Experts Group Audio Layer-3 (MP3) format.

A work memory 104 is used as a buffer memory for temporarily storing image data and moving image data captured by the image capturing unit 102, a memory for displaying an image on a display unit 106, and a work area of the control unit 101.

An operation unit 105 is a user interface configured to receive a user instruction to the digital camera 100. The operation unit 105 includes, for example, a power switch for inputting an instruction to turn on/off the digital camera 100 by the user, a release switch for inputting an instruction to capture an image, and a reproduction button for inputting an instruction to reproduce image data. Further, the operation unit 105 can also include a touch panel on the display unit 106. The release switch includes switches SW1 and SW2. If the release switch is half-pressed, the switch SW1 is turned on. In this way, a preparation instruction to perform preparation operations for image capturing, such as auto-focus (AF) processing, auto-exposure (AE) processing, auto-white-balance (AWB) processing, and pre-flash emission (EF) processing, is received. Further, if the release switch fully pressed, the switch SW2 is turned on. An image capturing instruction to perform an image capturing operation is received based on the above-described user operation.

The operation unit 105 further includes a mode selection switch and changes an operation mode of the control unit 101 to one of a still image capturing mode, a moving image capturing mode, and a reproduction mode. The still image capturing mode includes an auto image capturing mode, an auto scene discrimination mode, a manual mode, an aperture priority mode (Av mode), a shutter speed priority mode (Tv mode), and a program AE mode. Other modes are various scene modes that are image capturing settings for different image capturing scenes, a custom mode, and a silent mode. The user can change the mode directly to one of the above-described modes using the mode selection switch. Alternatively, the user can first switch to an image capturing mode list screen using the mode selection switch and then select one of a plurality of displayed modes and change the mode to the selected mode using another operation member.

Further, the operation unit 105 includes a button for adjusting the volume of sounds that are output from the speaker 108, the communication unit 111, and the connection unit 112, which will be described below. A user operation is received via the button so that the control unit 101 adjusts the amplitude of an audio signal and determines whether to output an audio signal. Further, the operation unit 105 also includes a button for inputting an instruction to turn on/off a wireless communication function via the communication unit 111.

The display unit 106 displays a viewfinder image during image capturing, captured image data, and a text for an interactive operation. The display unit 106 does not have to be built in the digital camera 100 and can be an external display unit connected to the digital camera 100. The digital camera 100 is configured to connect to the internal or external display unit 106 and include at least a display control function to control displays on the display unit 106.

A microphone 107 is used to input a sound wave such as a sound or audio to the digital camera 100. The microphone 107 converts a sound or audio into an electric signal and inputs the electric signal to the digital camera 100. The control unit 101 generates audio data based on the input electric signal. For example, the control unit 101 records the audio data in synchronization with moving image data captured by the image capturing unit 102. Further, for example, the control unit 101 records the audio data in association with image data captured by the image capturing unit 102. The microphone 107 can be configured to be removable from the digital camera 100 or built in the digital camera 100. For example, the digital camera 100 at least includes a unit for receiving an electric signal from the microphone 107. A frequency range of sound waves that can be converted into an electric signal by the microphone 107 is not limited to frequencies that are audible to the humans, and the frequency range can also include inaudible frequencies such as an ultrasonic wave and an infrasonic sound wave.

The speaker 108 is an electroacoustic transducer configured to output an electronic sound. The electronic sound is, for example, music, a warning sound, a focus sound, an electronic shutter sound, and an operation sound. In the present exemplary embodiment, the control unit 101 converts audio data recorded in the non-volatile memory 103 into an audio signal and outputs the audio signal using the speaker 108. The function of outputting the electronic sound from the speaker 108 by the control unit 101 is an example of an output function. For example, the user can recognize that a subject is brought into focus or an error occurs in the digital camera 100 by hearing the sound that is output from the speaker 108.

A power unit 109 is controlled by the control unit 101 to supply power to the components of the digital camera 100. The power unit 109 is a power source such as a lithium-ion battery or alkaline manganese dry cell.

The recording medium 110 records, for example, image data output from the image capturing unit 102. The recording medium 110 is, for example, a Secure Digital (SD) card or a CompactFlash (CF) card. The recording medium 110 can be configured to be removable from the digital camera 100 or built in the digital camera 100. For example, the digital camera 100 at least includes a function of accessing the recording medium 110.

The communication unit 111 is an interface for wirelessly connecting to an external device. The digital camera 100 according to the present exemplary embodiment exchanges data with an external device via the communication unit 111. For example, image data generated by the image capturing unit 102 and audio data recorded in the non-volatile memory 103 are transmitted to an external device via the communication unit 111. The external device is, for example, an information device such as a smartphone or a personal computer (PC), an external speaker such as an earphone or a headphone, and a strobe. In the present exemplary embodiment, the communication unit 111 includes an interface for communicating with an external device based on the Bluetooth® standards. Hereinafter, communication based on the Bluetooth® standards will be referred to as "Bluetooth® communication". The control unit 101 controls the communication unit 111 to thereby realize wireless communication with an external device. Communication methods are not limited to Bluetooth® and include, for example, wireless communication methods based on the Institute of Electrical and Electronics Engineers (IEEE) 802.11 standards, such as a wireless local area network (LAN) and infrared communication.

Bluetooth® will be described below. Two respective communication apparatuses that perform Bluetooth® communication play the roles of a central apparatus and a peripheral apparatus. A connection form of communication apparatuses in Bluetooth® is a star network of a master-slave method. The communication apparatus that operates as a central apparatus (hereinafter, the communication apparatus will be referred to as "central apparatus") becomes a master, and the communication apparatus that operates as a peripheral apparatus (hereinafter, the communication apparatus will be referred to as "peripheral apparatus") becomes a slave. The central apparatus manages participation of the peripheral apparatus in the network and sets various parameters in a wireless connection to the peripheral apparatus. The central apparatus can simultaneously be connected to a plurality of peripheral apparatuses. In the present exemplary embodiment, the digital camera 100 becomes a central apparatus, and an external speaker, such as an earphone or a headphone, and the strobe become a peripheral apparatus.

In Bluetooth® communication, the digital camera 100 is paired with the peripheral apparatus. Pairing is the processing of registering (recording in predetermined areas) identification information about the central apparatus in the peripheral apparatus and identification information about the peripheral apparatus in the central apparatus. The digital camera 100 according to the present exemplary embodiment records identification information about the paired peripheral apparatus in the non-volatile memory 103. In the present exemplary embodiment, for example, the digital camera 100 registers identification information about the headphone while the headphone registers identification information about the digital camera 100, and thereafter the digital camera 100 establishes a wireless connection to the headphone and determines that pairing is completed. Further, in a case where the digital camera 100 wirelessly connects to the paired peripheral apparatus, the user first performs operation so that the peripheral apparatus becomes searchable by the digital camera 100, and thereafter the user operates the digital camera 100 so that the digital camera 100 searches for the peripheral apparatus. Then, if the digital camera 100 detects the peripheral apparatus, the digital camera 100 establishes a wireless connection to the peripheral apparatus.

The connection unit 112 is an interface for a wired connection to an external device. The digital camera 100 according to the present exemplary embodiment exchanges data with an external device via the connection unit 112. For example, the control unit 101 transmits image data generated by the image capturing unit 102 and audio data recorded in the non-volatile memory 103 to an external device via the connection unit 112. Further, for example, the control unit 101 receives an audio signal and audio data from an external device, such as a microphone, via the connection unit 112. The connection unit 112 includes, for example, a phone connector (microphone terminal, headphone terminal) and a universal serial bus (USB) terminal. The digital camera 100 establishes a wired connection to an external speaker, such as an earphone or a headphone, an external microphone, and an information device, such as a smartphone or a PC, via the connection unit 112. Further, the connection unit 112 includes a detection unit (not illustrated) configured to detect whether an external device is connected. The control unit 101 detects that an external device is connected or disconnected, an external device is being connected, or an external device is not connected, via the detection unit.

In a case where the digital camera 100 connects to an external device such as a microphone or a headphone, the control unit 101 detects the type of the external device after establishing a connection to the external device. In Bluetooth® communication via the communication unit 111, the control unit 101 detects whether an external device is operable as, for example, a headphone or a microphone, using a service discovery protocol (SDP). Further, for example, in wireless LAN communication via the communication unit 111, the control unit 101 detects the type of an external device by receiving the type of the external device from the external device.

Further, for example, in a case where the connection unit 112 is a USB terminal, the control unit 101 receives a device descriptor from an external device to which a wired connection is established. The control unit 101 refers to the device descriptor to detect whether the external device is a headphone. In a case where an external device that is wirelessly connectable to the digital camera 100 is limited to an external speaker such as a headphone, the control unit 101 determines whether a headphone is detected based on establishment of a wireless connection to an external device. Further, a terminal (phone connector) for an external speaker is a terminal that is to be connected to a speaker. A terminal (phone connector) for an external microphone is a terminal that is to be connected to a microphone. In a case where an external device is wire-connected to a terminal to which only a predetermined device is to be connected, the control unit 101 determines whether a headphone or a microphone is detected based on establishment of a wired connection to the external device.

Next, an external view of the digital camera 100 will be described below. FIG. 1B illustrates an example of an external view of a front side of the digital camera 100, and FIG. 1C illustrates an example of an external view of a rear side of the digital camera 100. A release switch 105*a*, a reproduction button 105*b*, a direction key 105*c*, and a touch panel 105*d* are operation members of the operation unit 105. Further, the display unit 106 displays an image acquired as a result of image capturing by the image capturing unit 102.

Further, the digital camera 100 has power states that are a power-on state and a sleep state. In the present exemplary embodiment, the sleep state is, for example, a state where no power is supplied to the image capturing unit 102 and the display unit 106 of the digital camera 100. The power consumption in the sleep state is at least less than that in the power-on state. If the user turns off the power switch of the operation unit 105, the digital camera 100 is changed to the sleep state. In the case where the power switch is turned off and the digital camera 100 is changed to the sleep state, if the power switch is turned on, the digital camera 100 is changed from the sleep state to the power-on state. Further, if a predetermined length of time passes while the digital camera 100 in the power-on state is not operated by the user, the digital camera 100 is automatically changed to the sleep state to save power. A function of executing this operation will be referred to as "auto power-off function" in the present exemplary embodiment. Further, the sleep state as a result of change by the auto power-off function will be referred to as "auto power-off state" in the present exemplary embodiment. In the case of the auto power-off state, the digital camera 100 is changed from the sleep state to the power-on state if a member of the operation unit 105, such as the release switch 105*a* or the reproduction button 105*b*, is operated by the user. In the present exemplary embodiment, in the case where the digital camera 100 is changed to the sleep state by turning off the power switch, the digital camera 100 is not changed to the power-on state even if a member of the operation unit 105, such as the release switch 105*a* or the reproduction button 105*b*, is operated by the user.

An example of the configuration of the digital camera 100 has been described above.

<Description of Shutter Modes>

Shutter modes of the digital camera 100 will be described below. The digital camera 100 has two shutter modes that are an electronic shutter mode and a mechanical shutter mode.

In the mechanical shutter mode, the control unit 101 controls the shutter of the image capturing unit 102 to open/close the shutter so that the image sensor is exposed and an image is captured. Image capturing in the mechanical shutter mode is advantageous in that captured image data is less likely to have a rolling shutter distortion and has less noise.

In the electronic shutter mode, the control unit 101 performs image capturing without opening/closing the shutter. The shutter is opened during image capturing in the electronic shutter mode. The control unit 101 refers to a time measurement unit (not illustrated) to thereby control an exposure time of the image sensor of the image capturing unit 102. Image capturing in the electronic shutter mode is advantageous in that a faster shutter speed than that in the mechanical shutter mode can be set and vibrations are less likely to occur during image capturing.

No shutter sound is produced during image capturing in the electronic shutter mode because the shutter is not opened/closed. Thus, during image capturing in the electronic shutter mode, the control unit 101 outputs an electronic shutter sound recorded in the non-volatile memory 103 via the speaker 108, the communication unit 111, and the connection unit 112 to thereby notify the user that an image is captured. On the other hand, a shutter sound is produced during image capturing in the mechanical shutter mode because the shutter is opened/closed.

<Description of Silent Mode>

A silent mode that is an operation state of the digital camera 100 according to the present exemplary embodiment will be described below. In the silent mode, the digital camera 100 operates to prevent production of a sound. The silent mode is a suitable operation state for image capturing at a place where silence is required, such as a sports game venue or an art museum. In the silent mode, the digital camera 100 does not output an electronic sound from the speaker 108. The user can turn on and off the silent mode by operating the digital camera 100 via the operation unit 105.

Further, in the present exemplary embodiment, the digital camera 100 operates in the electronic shutter mode during the silent mode. Since the shutter is not opened/closed in the electronic shutter mode, the digital camera 100 is less likely to produce a sound during image capturing. On the other hand, in the mechanical shutter mode, a sound of opening/closing the shutter is produced when an image is captured, so that it is difficult for the digital camera 100 to capture an image without producing a sound. During image capturing in the silent mode, the control unit 101 performs control so that no electronic shutter sound is output from the speaker 108. Furthermore, the digital camera 100 does not emit a pre-flash or AF-assist light during the silent mode because it is often prohibited to capture an image of an athlete during a game or a painting in an art museum using a flash (strobe) at a place where silence is required, such as a sports game venue or an art museum.

During the silent mode, however, the digital camera 100 can output an electronic sound to the headphone via the communication unit 111 and the connection unit 112. Specifically, even if the digital camera 100 outputs an electronic sound to the headphone, the electronic sound is likely to be transmitted only to the user of the digital camera 100, so that the electronic sound output from the headphone is less likely to become an unwanted sound.

The digital camera 100 according to the present exemplary embodiment can be changed to the silent mode in a case where it is determined that the volume of a sound output from the speaker 108 is changed to zero (no sound is output). In the present exemplary embodiment, the minimum value of the volume of the sound output from the speaker 108 is zero. As described above, the digital camera 100 can be changed to the silent mode when the volume of the sound output from the speaker 108 is set to the minimum value.

<Setting of Shutter Mode, Electronic Sound Output, and Silent Mode>

Figure 2A:
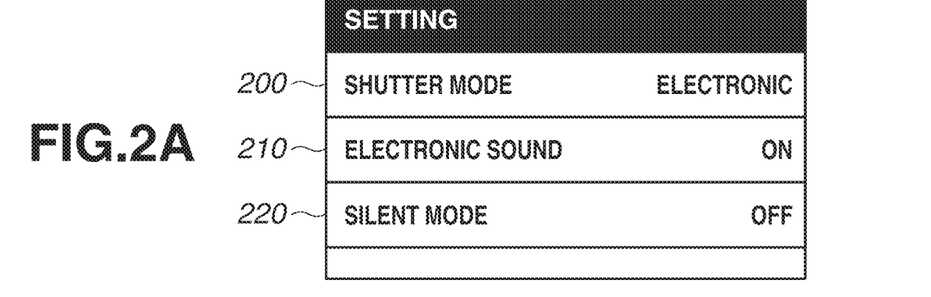
FIG. 2A illustrates an example of a screen display for setting a shutter mode, an electronic sound output, and a silent mode of the digital camera according to the first exemplary embodiment.

An example of a method of setting the shutter mode, the electronic sound output, and the silent mode will be described below. FIGS. 2A to 2D illustrate an example of a menu screen of the digital camera 100 for setting the shutter mode, the electronic sound output, and the silent mode. FIGS. 3A and 3B illustrate an example of the menu screen of the digital camera 100 in a case where the digital camera 100 is changed to the silent mode. If a user operation to change to the menu screen is received via the operation unit 105, the control unit 101 displays the menu screen on, for example, the display unit 106. The user can change the settings by operating the operation unit 105. In the present exemplary embodiment, the control unit 101 displays the menu screen as illustrated in FIG. 2A. An item 200 is an item for setting the shutter mode. An item 210 is an item for setting whether the digital camera 100 is to output the electronic sound to the headphone. An item 220 is an item for setting whether the digital camera 100 is to be operated in the silent mode. In the present exemplary embodiment, if an item is selected, the control unit 101 performs control so that the other items are not displayed on the display unit 106. This makes it easy for the user to select an option of the selected item.

Figure 2B:
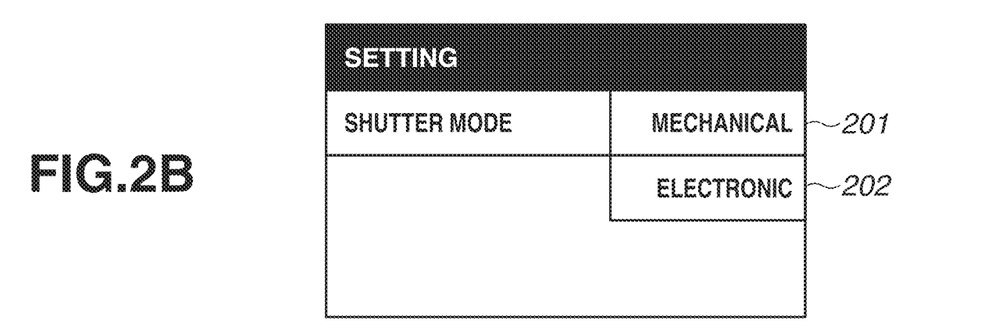
FIG. 2B illustrates an example of a screen display for setting the shutter mode of the digital camera according to the first exemplary embodiment.
Figure 3A:
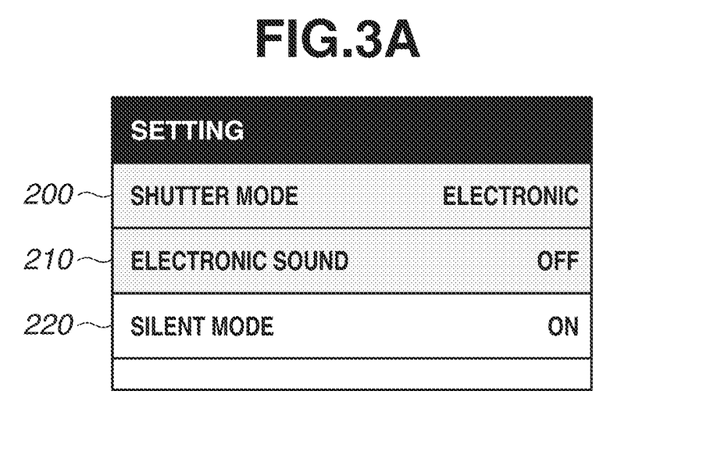
FIG. 3A illustrates an example of a setting screen of the digital camera to which an external speaker is not connected, according to the first exemplary embodiment.
Figure 3B:
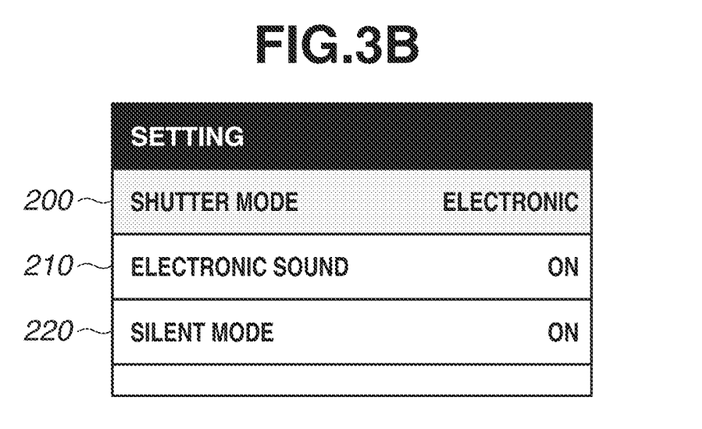
FIG. 3B illustrates an example of a setting screen of the digital camera to which an external speaker is connected.

In FIG. 2A, if the user selects the item 200 via the operation unit 105, the control unit 101 displays a menu for selecting one of the mechanical shutter mode and the electronic shutter mode as illustrated in FIG. 2B. In a case where the user selects an option 201, the digital camera 100 is changed to the setting of capturing an image in the mechanical shutter mode. In this case, the control unit 101 performs control so that no electronic shutter sound is output to the speaker 108 regardless of the electronic sound setting. This control is performed because, for example, if the user hears both the sound of opening/closing the shutter of the image capturing unit 102 and the electronic shutter sound when an image is captured, it can be difficult for the user to determine whether the image is captured at the timing of the former sound or the timing of the latter sound. In a case where the user selects option 202, the digital camera 100 is changed to the setting of capturing an image in the electronic shutter mode. In this case, unless the silent mode is set, the control unit 101 performs control so that the electronic sound is output to the speaker 108.

Figure 2C:
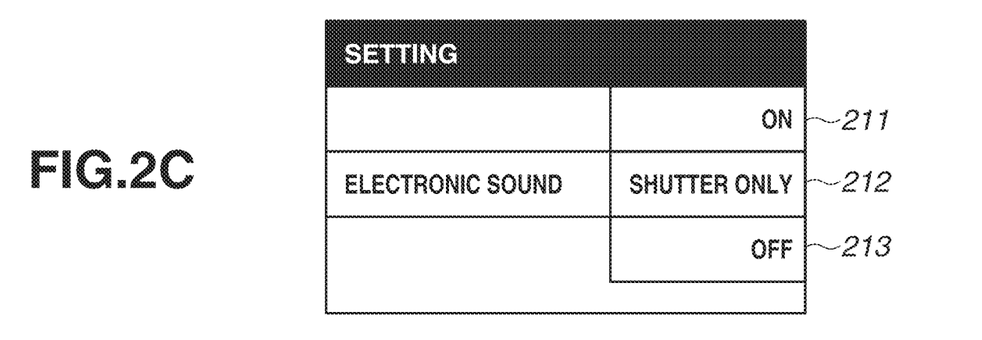
FIG. 2C illustrates an example of a screen display for setting the electronic sound output according to the first exemplary embodiment.

In FIG. 2A, if the user selects the item 210 via the operation unit 105, the control unit 101 displays a menu for selecting whether to output the electronic sound as illustrated in FIG. 2C. In a case where the user selects an option 211 ("ON"), unless the silent mode is set, the control unit 101 performs control so that the electronic sound is output from the speaker 108. In a case where the user selects an option 212 ("SHUTTER ONLY"), unless the silent mode is set, the control unit 101 performs control so that the speaker 108 outputs the electronic shutter sound when an image is captured. Meanwhile, the control unit 101 performs control so that the other electronic sounds are not output. In a case where the user selects an option 213 ("OFF"), the control unit 101 performs control so that no electronic sound is output from the speaker 108 and the external speaker. As described above, the user can enable (turn on) or disable (turn off) the electronic sound output function of the digital camera 100 by selecting an option of the item 210. The control unit 101 does not change the option of the item 220 even in a case where the option of the item 210 is changed.

Figure 2D:
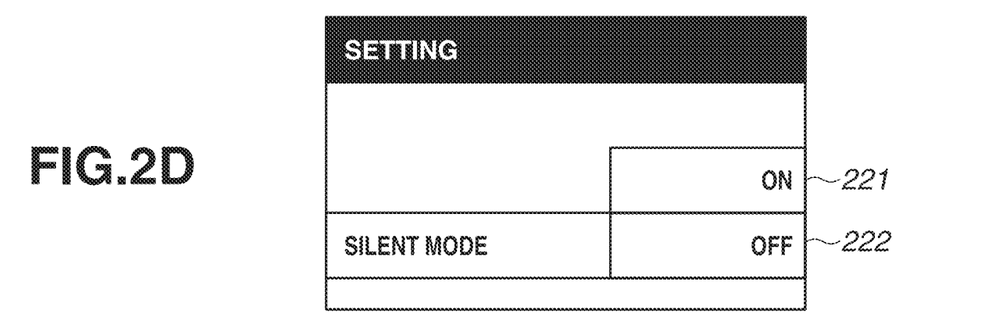
FIG. 2D illustrates an example of a screen display for setting the silent mode of the digital camera according to the first exemplary embodiment.

In FIG. 2A, if the user selects the item 220 via the operation unit 105, the control unit 101 displays a menu for selecting whether to operate in the silent mode (whether to turn on or off) as illustrated in FIG. 2D. In a case where the user selects an option 221 ("ON"), the digital camera 100 operates in the silent mode. In a case where the user selects an option 222 ("OFF"), the digital camera 100 cancels the silent mode. In the case where the user selects the option 221 ("ON"), the control unit 101 operates in the electronic shutter mode and performs control so that no electronic sound is output from the speaker 108. For example, in a case where the silent mode is on, the control unit 101 displays the items 200 and 210 that are in a shaded state so that the settings of the shutter mode and the electronic sound cannot be changed as illustrated in FIG. 3A.

In a case where an external speaker such as a headphone is connected, even if the digital camera 100 is operating in the silent mode, the control unit 101 can output the electronic sound to the external speaker. In the present exemplary embodiment, for example, if a headphone is connected to the digital camera 100 in the silent mode, the control unit 101 automatically changes the setting so that the electronic sound is output to the headphone. In this case, for example, the control unit 101 displays the item 210 that is not in the shaded state as illustrated in FIG. 3B, which is different from the screen illustrated in FIG. 3A. If the setting of the item 210 is changed by a user operation, the control unit 101 controls whether to output the electronic sound to the headphone based on the setting. In the silent mode, however, the control unit 101 does not output the electronic sound from the speaker 108 regardless of the setting of the item 210. Thus, even in the setting of the same item, the processing of the control unit 101 is automatically switched depending on whether a headphone is connected.

As described above, in a case where a user operation is received to operate the digital camera 100 in the silent mode, the control unit 101 automatically performs control so that the digital camera 100 operates in the electronic shutter mode and no electronic sound is output. However, in a case where a headphone is connected to the digital camera 100, the control unit 101 can output the electronic sound to the headphone. In this way, the user can hear the electronic sound while operating the digital camera 100 in the silent mode. Especially the digital camera 100 can reproduce the electronic shutter sound from the headphone during the silent mode in which no sound is output to a surrounding area, so that the user can determine the timing at which the digital camera 100 captures an image.

While the control unit 101 displays the item in the shaded state in FIGS. 3A and 3B to indicate that a user operation will not be received in the present exemplary embodiment, a display method other than displaying in the shaded state can be used. For example, the control unit 101 does not display an item for which user operations are not to be received. Further, in a case where, for example, an item for which user operations are not to be received is selected by a user operation, the control unit 101 displays a warning such as "change to the selected item is impossible in the silent mode". Further, in a case where, for example, an item for which user operations are not to be received is selected by a user operation, the control unit 101 does not return a response to the user to thereby notify the user that change to the selected item is impossible.

<Process of Wirelessly Connecting to External Speaker>

An example of a process by which the digital camera 100 wirelessly connects to an external speaker will be described below with reference to FIG. 4. Hereinafter, an external speaker that is wire-connected to the digital camera 100 will be referred to as "wired headphone". Further, an external speaker that is wirelessly connected to the digital camera 100 will be referred to as "wireless headphone". The control unit 101 loads software recorded in the non-volatile memory 103 into the work memory 104 and executes the loaded software to thereby realize the process by the digital camera 100. Further, the process is started if the power switch of the digital camera 100 is turned on.

In step S401, the control unit 101 determines whether the mode is changed to the silent mode. For example, the control unit 101 determines whether the option 221 illustrated in FIG. 2D is selected by the user via the operation unit 105. The control unit 101 repeats execution of step S401 until the mode is changed to the silent mode. In a case where the control unit 101 determines that the mode is changed to the silent mode (YES in step S401), the processing proceeds to step S402.

In step S402, the control unit 101 determines whether an external speaker is connected. For example, the control unit 101 determines whether a wireless headphone is connected to the communication unit 111 and whether a wired headphone is connected to the connection unit 112. In a case where at least one of a wired headphone and a wireless headphone is connected, the control unit 101 determines that an external speaker is connected. In a case where the control unit 101 determines that an external speaker is connected (YES in step S402), the process ends. On the other hand, in a case where the control unit 101 determines that an external speaker is not connected (NO in step S402), the processing proceeds to step S403.

In step S403, the control unit 101 determines whether the digital camera 100 is paired with the wireless headphone. For example, the control unit 101 determines whether identification information about the wireless headphone is recorded in the non-volatile memory 103. In a case where the control unit 101 determines that the digital camera 100 is not paired with the wireless headphone (NO in step S403), the process ends. In the case where the control unit 101 determines that the digital camera 100 is not paired with the wireless headphone, the wireless communication function is not enabled. On the other hand, in a case where the control unit 101 determines that the digital camera 100 is paired with the wireless headphone (YES in step S403), the processing proceeds to step S404.

In step S404, the control unit 101 determines whether the wireless communication function is enabled. For example, the control unit 101 determines whether a Bluetooth® communication function is enabled. In a case where the control unit 101 determines that the wireless communication function is enabled (YES in step S404), the processing proceeds to step S406. On the other hand, in a case where the control unit 101 determines that the wireless communication function is not enabled (disabled) (NO in step S404), the processing proceeds to step S405.

In step S405, the control unit 101 enables the wireless communication function. For example, the control unit 101 turns on the Bluetooth® communication function. At this time, the communication unit 111 is activated. In a case where the communication unit 111 is not activated, the control unit 101 activates the communication unit 111. For example, in a case where no power is supplied to the communication unit 111, the control unit 101 controls the power unit 109 to supply power to the communication unit 111. In this case, the control unit 101 activates the communication unit 111 and then turns on the Bluetooth® communication function.

In step S406, the control unit 101 searches for a wireless headphone via the communication unit 111. For example, in step S406, the control unit 101 starts Bluetooth® reference processing and broadcasts an inquiry (IQ) packet via the communication unit 111.

In step S407, the control unit 101 determines whether a paired wireless headphone is detected. For example, the control unit 101 determines whether a frequency hop synchronization (FHS) packet is received from a paired wireless headphone in response to the IQ packet transmitted in step S406. The FHS packet contains identification information about a wireless headphone. The control unit 101 compares the identification information contained in the FHS packet with the identification information about the wireless headphone that is recorded in the non-volatile memory 103 and determines whether the external device from which the FHS packet is transmitted is paired. Further, if a FHS packet is received from a paired wireless headphone, the control unit 101 ends the reference processing started in step S406. In a case where the control unit 101 detects a wireless headphone (YES in step S407), the processing proceeds to step S408. On the other hand, in a case where the control unit 101 does not detect a wireless headphone (NO in step S407), the processing proceeds to step S409. First, the case where the control unit 101 detects a wireless headphone will be described below.

In step S408, the control unit 101 establishes a wireless connection with the wireless headphone detected in step S407. For example, the control unit 101 executes call processing and establishes a wireless connection with the paired wireless headphone via the communication unit 111. If a wireless connection is established with the wireless headphone, the process ends. Next, the case where the control unit 101 does not detect a wireless headphone in step S407 will be described below.

In step S409, the control unit 101 determines whether a predetermined amount of time has passed since the start of the wireless headphone search. For example, the control unit 101 determines whether one minute or longer has passed since the start of the reference processing. In a case where the control unit 101 determines that the predetermined amount of time has not passed since the start of the wireless headphone search (NO in step S409), the processing returns to step S406, and the control unit 101 continues the wireless headphone search. On the other hand, in a case where the control unit 101 determines that the predetermined amount of time has passed since the start of the wireless headphone search (YES in step S409), the processing proceeds to step S410.

In step S410, the control unit 101 determines whether the wireless communication function is enabled in response to a change to the silent mode. For example, the control unit 101 determines whether the processing of step S405 is executed. The processing of step S405 is, for example, the processing of turning on the Bluetooth® communication function by the control unit 101 as described above. In a case where the control unit 101 determines that the wireless communication function is not enabled in response to a change to the silent mode (NO in step S410), the process ends. On the other hand, in a case where the control unit 101 determines that the wireless communication function is enabled in response to a change to the silent mode (YES in step S410), the processing proceeds to step S411.

In step S411, the control unit 101 disables the wireless communication function. For example, the control unit 101 turns off the Bluetooth® wireless communication function. In this way, the control unit 101 reduces the time during which the power consumption increases because the wireless communication function is continuously enabled when the wireless headphone is not used.

An example of a process by which the digital camera 100 wirelessly connects to an external speaker has been described above. With the process, the user can wirelessly connect the digital camera 100 to a wireless headphone by simply changing the digital camera 100 to the silent mode without performing a further operation to wirelessly connect a headphone.

The digital camera 100 according to the present exemplary embodiment wirelessly connects to the wireless headphone based on a method classified as Bluetooth® Classic among the Bluetooth® methods. In an alternative wireless connection method, the digital camera 100 first wirelessly may connect to a wireless headphone based on Bluetooth® Low Energy and then change to a wireless connection to the wireless headphone based on Bluetooth® Classic. In this case, the control unit 101 starts scanning an advertising packet in step S406 in FIG. 4 to thereby search for a wireless headphone. Then, in step S407 in FIG. 4, the control unit 101 determines whether a wireless headphone is detected based on whether an advertising packet is received from the wireless headphone. In Bluetooth® Low Energy, the control unit 101 does not broadcast an IQ packet. In a case where a wireless headphone is detected, the control unit 101 establishes a wireless connection with the wireless headphone based on Bluetooth® Low Energy and then changes from the wireless connection based on Bluetooth® Low Energy to a wireless connection based on Bluetooth® Classic in step S408 in FIG. 4.

The method of changing from a wireless connection based on Bluetooth® Low Energy to a wireless connection based on Bluetooth® Classic is referred to as "handover". In general, communication based on Bluetooth® Low Energy is shorter in an average amount of time that is needed for a communication apparatus to establish a wireless connection than communication based on Bluetooth® Classic, so that the digital camera 100 can establish a wireless connection with a wireless headphone in shorter time using handover.

The digital camera 100 according to the present exemplary embodiment does not emit light, such as a pre-flash or AF-assist light, in the silent mode as described above. Thus, in a case where the digital camera 100 is wirelessly connected to a strobe via the communication unit 111, the control unit 101 can disconnect the wireless connection with the strobe in response to a change to the silent mode. In this case, if the silent mode is turned off, the control unit 101 wirelessly connects to the strobe again. In this way, the digital camera 100 reduces power consumption in the state of the silent mode.

The digital camera 100 can limit user operations so that the silent mode is not cancelled while the process of establishing a wireless connection with a wireless headphone is executed. For example, the digital camera 100 can limit user operations so that an operation of enabling an output function is not received until it is determined that a wireless connection is established with the wireless headphone or until it is determined that establishment of a wireless connection with the wireless headphone fails.

<Process of Disconnecting Wireless Connection to External Speaker>

Figure 5:
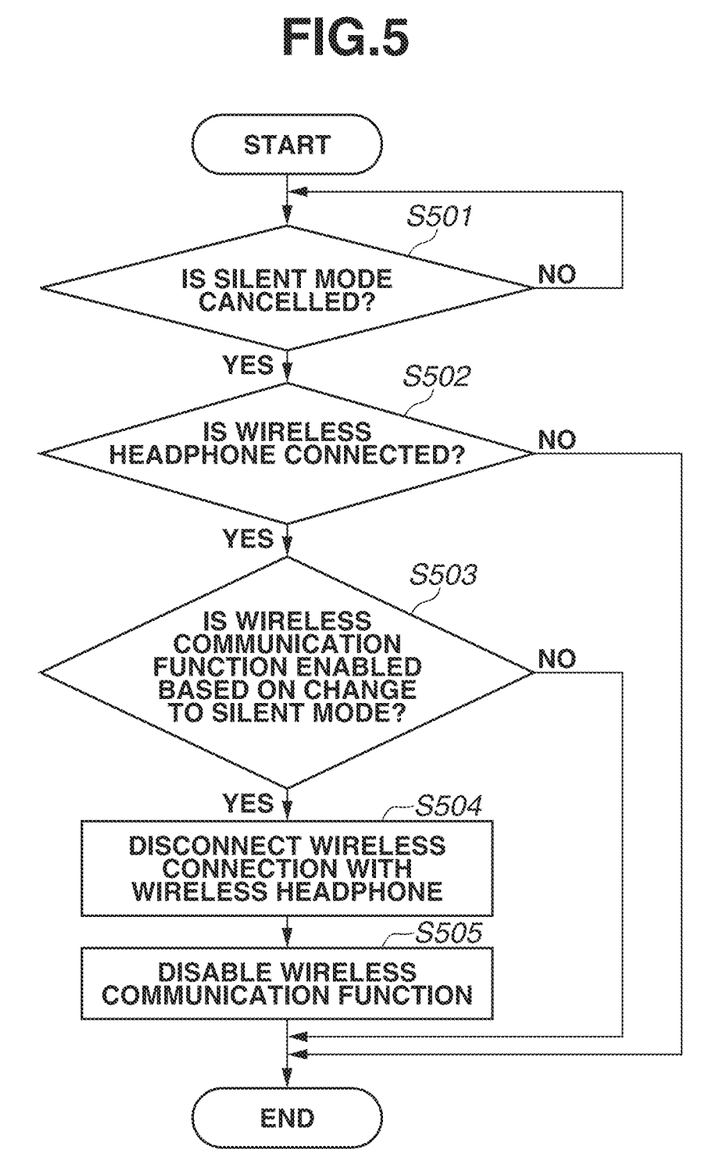
FIG. 5 is a flowchart illustrating an example of a process of disconnecting a wireless connection between the digital camera according to the first exemplary embodiment and the wireless headphone.

An example of a process by which the digital camera 100 disconnects a wireless connection with an external speaker will be described below with reference to FIG. 5. The control unit 101 loads software recorded in the non-volatile memory 103 into the work memory 104 and executes the developed software to thereby realize the process by the digital camera 100. Further, the process is started if the power switch of the digital camera 100 is turned on.

In step S501, the control unit 101 determines whether the silent mode is cancelled. For example, the control unit 101 determines whether the option 222 in FIG. 2D is selected by the user via the operation unit 105. In the state of the silent mode, the control unit 101 repeats execution of step S501. In a case where the control unit 101 determines that the silent mode is cancelled (YES in step S501), the processing proceeds to step S502.

In step S502, the control unit 101 determines whether a wireless headphone is connected. In a case where the control unit 101 determines that a wireless headphone is connected (YES in step S502), the processing proceeds to step S503. On the other hand, in a case where the control unit 101 determines that a wireless headphone is not connected (NO in step S502), the process ends. In step S502, the control unit 101 does not determine whether a wired headphone is connected.

In step S503, the control unit 101 determines whether the wireless communication function is enabled in response to a change to the silent mode. For example, the control unit 101 determines whether step S405 in FIG. 4 is executed. In a case where the control unit 101 determines that the wireless communication function is enabled in response to a change to the silent mode (YES in step S503), the processing proceeds to step S504. On the other hand, in a case where the control unit 101 determines that the wireless communication function is not enabled in response to a change to the silent mode (NO in step S503), the process ends. In the present exemplary embodiment, in a case where the power switch is turned off after step S405 in FIG. 4 is executed, a flag that indicates that step S405 in FIG. 4 is executed is erased. The flag is recorded in the work memory 104 if step S405 in FIG. 4 is executed by the control unit 101. For example, in a case where step S405 in FIG. 4 is not executed before the digital camera 100 executes step S503 after the digital camera 100 is changed to the power-on state, the control unit 101 determines that the wireless communication function is not enabled in response to a change to the silent mode.

In step S504, the control unit 101 disconnects the wireless connection with the wireless headphone. Step S504 is executed in a case where a wireless headphone is connected in response to a change to the silent mode. In this case, after the silent mode is cancelled, the user can capture an image with the digital camera 100 without disconnecting the wireless connection with the wireless headphone. Especially in a case where an image capturing apparatus such as a digital camera is used, reproduction of the electronic shutter sound can be delayed with a wireless headphone that often causes a communication delay due to a surrounding radio wave condition, and the user may not be able to determine an accurate timing of image capturing. With the wired headphone or the speaker 108 of the digital camera 100, on the other hand, a delay in electronic sound reproduction due to a surrounding radio wave condition is less likely to occur. Thus, in a case where a wireless headphone is connected in response to a change to the silent mode, the digital camera 100 according to the present exemplary embodiment disconnects the wireless connection with the wireless headphone if the silent mode is cancelled. Then, after the wireless connection with the wireless headphone is disconnected, the control unit 101 performs control so that the speaker 108 outputs the electronic sound. After step S504, if a wired headphone is connected to the digital camera 100, the control unit 101 performs control so that not the speaker 108 but the connected wired headphone outputs the electronic sound.

In step S505, the control unit 101 disables the wireless communication function. For example, the control unit 101 turns off the Bluetooth® communication function. In a case where no external device is wirelessly connected, the control unit 101 controls the power unit 109 to thereby stop supplying power to the communication unit 111.

An example of a process of disconnecting a wireless connection with an external speaker by the digital camera 100 has been described above. With the process, the user can disconnect the wireless connection with the wireless headphone that is wirelessly connected to the digital camera 100 by cancelling the silent mode of the digital camera 100. It is better for especially an image capturing apparatus such as the digital camera 100 to output an electronic sound from an internal speaker than from a wireless headphone when the image capturing apparatus is not operating in the silent mode, because the speaker 108 outputs the electronic shutter sound more accurately at a timing of image capturing by the digital camera 100 than the wireless headphone does due to a communication delay.

Figure 4:
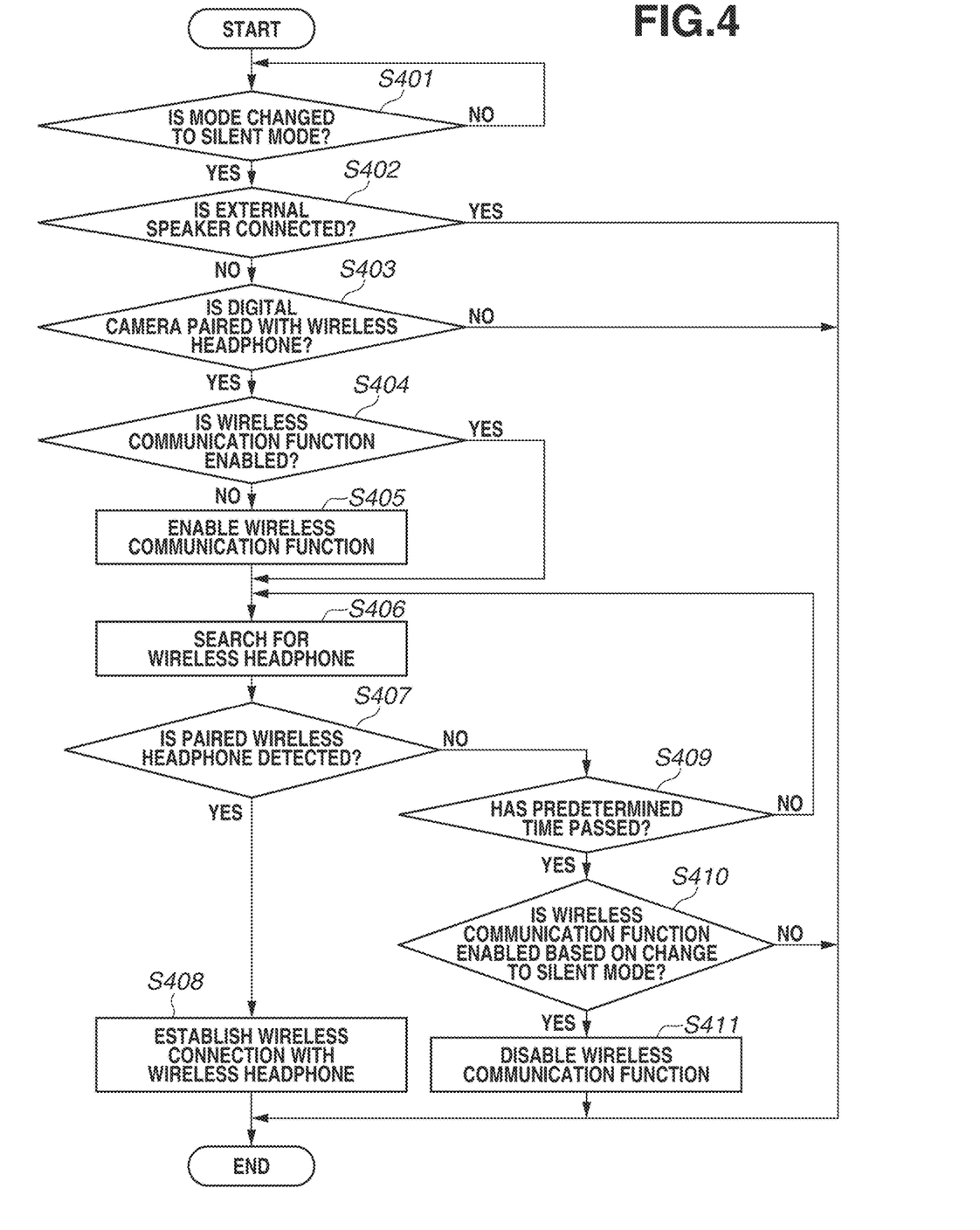
FIG. 4 is a flowchart illustrating an example of a process of wirelessly connecting the digital camera according to the first exemplary embodiment to a wireless headphone.

The digital camera 100 according to the present exemplary embodiment can be configured such that the silent mode cannot be cancelled while the process of establishing a wireless connection with a wireless headphone in FIG. 4 is executed. This prevents errors that arise from an interruption in the processing of connecting the digital camera 100 to the wireless headphone.

While the output function and the silent mode of the digital camera 100 according to the present exemplary embodiment are described as being individually settable, the present exemplary embodiment is not limited to those described above. For example, the digital camera 100 according to the present exemplary embodiment can be changed to the silent mode in a case where it is determined that the volume of the sound output from the speaker 108 is changed to zero (the sound is not to be output). For example, the digital camera 100 changes the volume of the sound output from the speaker 108 based on a user operation received via the operation unit 105. In the present exemplary embodiment, the minimum value of the volume is zero. As described above, the digital camera 100 can be configured so that the digital camera 100 is changed to the silent mode if the volume of the sound output from the speaker 108 is set to the minimum value. Thus, the user can cause the digital camera 100 to operate in the silent mode by changing the volume of the sound output from the speaker 108 to zero.

In the first exemplary embodiment, an example of a method has been described in which the digital camera 100 wirelessly connects to a paired wireless headphone if the digital camera 100 is changed to the silent mode. In a second exemplary embodiment, an example of a method will be described below in which the digital camera 100 wirelessly connects to a wireless headphone if the digital camera 100 is changed to the silent mode in a case where the digital camera 100 is not paired with the wireless headphone. The digital camera 100 and the external device according to the present exemplary embodiment are similar to those in the first exemplary embodiment.

In a case where the digital camera 100 wirelessly connects to a wireless headphone that is unpaired with the digital camera 100 if the digital camera 100 is changed to the silent mode, there is a case where the digital camera 100 notifies the user of information about the digital camera 100 by audio guidance. In the audio guidance, the digital camera 100 outputs audio from the speaker 108 to notify the user of information about the digital camera 100, such as an operation method, parameters that relate to image capturing, and an operation state of the digital camera 100. The audio to be output in the audio guidance is not audio that is a mere sound effect or beep sound but audio that describes the content of the notification to the user using an audio language. In the present exemplary embodiment, the digital camera 100 records audio data in the non-volatile memory 103. Hereinafter, the function of notifying the user of information about the digital camera 100 by audio guidance will be referred to as "audio guide mode". In a case where the audio guide mode is used, the user may wish to listen to the audio guidance on the operation method of the digital camera 100 while using the digital camera 100 in the silent mode. Thus, in a case where the audio guide mode is on, even if a paired wireless headphone is not registered, the digital camera 100 according to the present exemplary embodiment starts processing to wirelessly connect to a wireless headphone if the digital camera 100 is changed to the silent mode.

Figure 6:
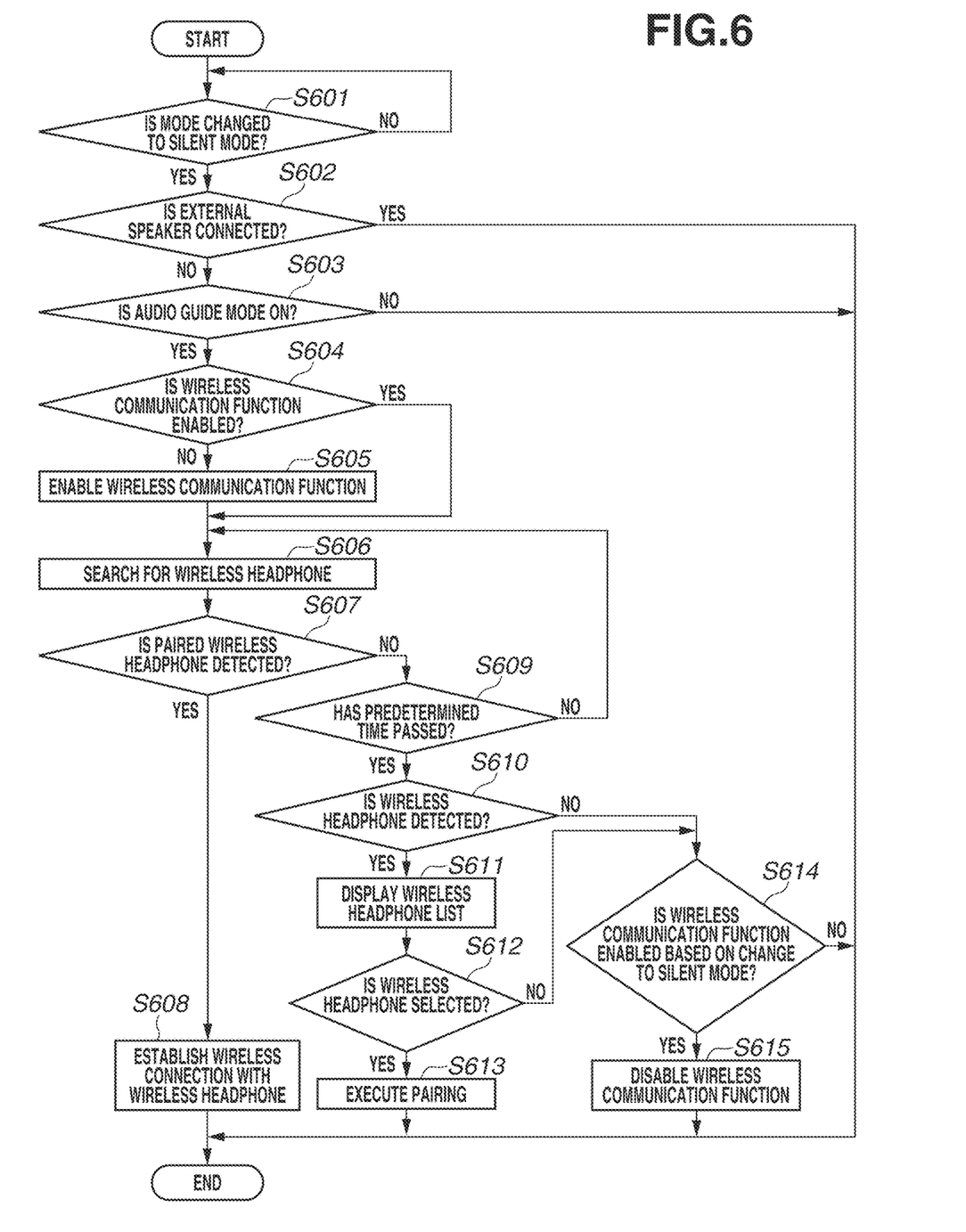
FIG. 6 is a flowchart illustrating an example of a process of wirelessly connecting a digital camera according to a second exemplary embodiment to a wireless headphone.

An example of a process of wirelessly connecting the digital camera 100 to an external speaker according to the present exemplary embodiment will be described below with reference to FIG. 6. The control unit 101 loads software recorded in the non-volatile memory 103 into the work memory 104 and executes the loaded software to thereby realize the process by the digital camera 100. Further, the process is started if the power switch of the digital camera 100 is turned on.

In step S601, the control unit 101 determines whether the mode is changed to the silent mode. For example, the control unit 101 determines whether the option 221 in FIG. 2D is selected by the user via the operation unit 105. The control unit 101 repeats execution of step S601 until the mode is changed to the silent mode. In a case where the control unit 101 determines that the mode is changed to the silent mode (YES in step S601), the processing proceeds to step S602. The processing in step S601 is similar to the processing in step S401 in FIG. 4.

In step S602, the control unit 101 determines whether an external speaker is connected. For example, the control unit 101 determines whether a wireless headphone is connected to the communication unit 111 and whether a wired headphone is connected to the connection unit 112. In a case where at least one of a wired headphone and a wireless headphone is connected, the control unit 101 determines that an external speaker is connected. In a case where the control unit 101 determines that an external speaker is connected (YES in step S602), the process ends. On the other hand, in a case where the control unit 101 determines that an external speaker is not connected (NO in step S602), the processing proceeds to step S603. The processing in step S602 is similar to the processing in step S402 in FIG. 4.

In step S603, the control unit 101 determines whether the audio guide mode is on or off. In a case where the control unit 101 determines that the audio guide mode is off (NO in step S603), the process ends. On the other hand, in a case where the control unit 101 determines that the audio guide mode is on (YES in step S603), the processing proceeds to step S604.

In step S604, the control unit 101 determines whether the wireless communication function is enabled. For example, the control unit 101 determines whether the Bluetooth® communication function is enabled. In a case where the control unit 101 determines that the wireless communication function is enabled (YES in step S604), the processing proceeds to step S606. On the other hand, in a case where the control unit 101 determines that the wireless communication function is not enabled (disabled) (NO in step S604), the processing proceeds to step S605. The processing in step S604 is similar to the processing in step S404 in FIG. 4.

In step S605, the control unit 101 enables the wireless communication function. For example, the control unit 101 turns on the Bluetooth® communication function. In a case where the communication unit 111 is not activated, the control unit 101 activates the communication unit 111. For example, in a case where no power is supplied to the communication unit 111, the control unit 101 controls the power unit 109 to supply power to the communication unit 111. The processing in step S605 is similar to the processing in step S405 in FIG. 4.

In step S606, the control unit 101 searches for a wireless headphone via the communication unit 111. For example, in step S606, the control unit 101 starts Bluetooth® reference processing and broadcasts an IQ packet via the communication unit 111. The processing in step S606 is similar to the processing in step S406 in FIG. 4.

In step S607, the control unit 101 determines whether a paired wireless headphone is detected. For example, the control unit 101 determines whether a FHS packet is received from a paired wireless headphone in response to the IQ packet transmitted in step S606. The FHS packet contains identification information about a wireless headphone. The control unit 101 compares the identification information contained in the FHS packet with the identification information about the wireless headphone that is recorded in the non-volatile memory 103 and determines whether the external device from which the FHS packet is transmitted is paired. Further, if a FHS packet is received from a paired wireless headphone, the control unit 101 ends the reference processing started in step S606. In step S607, if the control unit 101 determines that an unpaired wireless headphone is detected, the control unit 101 records at least identification information about the wireless headphone in the work memory 104. In a case where the control unit 101 detects a paired wireless headphone (YES in step S607), the processing proceeds to step S608. On the other hand, in a case where the control unit 101 does not detect a paired wireless headphone (NO in step S607), the processing proceeds to step S609. First, the case where the control unit 101 detects a paired wireless headphone will be described below.

In step S608, the control unit 101 establishes a wireless connection with the paired wireless headphone detected in step S607. For example, the control unit 101 executes call processing and establishes a wireless connection with the paired wireless headphone via the communication unit 111. If a wireless connection is established with the paired wireless headphone, the process ends. The processing in step S608 is similar to the processing in step S408 in FIG. 4. Next, the case where the control unit 101 does not detect a wireless headphone in step S607 will be described below.

In step S609, the control unit 101 determines whether a predetermined amount of time has passed since the start of the wireless headphone search. For example, the control unit 101 determines whether one minute or longer has passed since the start of the reference processing. In a case where the control unit 101 determines that the predetermined amount of time has not passed since the start of the wireless headphone search (NO in step S609), the processing returns to step S606, and the control unit 101 continues the wireless headphone search. On the other hand, in a case where the control unit 101 determines that the predetermined amount of time has passed since the start of the wireless headphone search (YES in step S609), the processing proceeds to step S610. The processing in step S609 is similar to the processing in step S409 in FIG. 4.

In step S610, the control unit 101 determines whether a wireless headphone is detected. For example, the control unit 101 determines whether identification information about an unpaired wireless headphone is recorded in the work memory 104. In the case where a paired headphone is detected, the processing proceeds from step S607 to step S608. Therefore, the wireless headphone detected in step S610 is not a paired wireless headphone. In a case where the control unit 101 determines that a wireless headphone is detected (YES in step S610), the processing proceeds to step S611. On the other hand, in a case where the control unit 101 determines that a wireless headphone is not detected (NO in step S610), the processing proceeds to step S614. First, the case where the control unit 101 determines that a wireless headphone is detected will be described below.

Figure 7A:
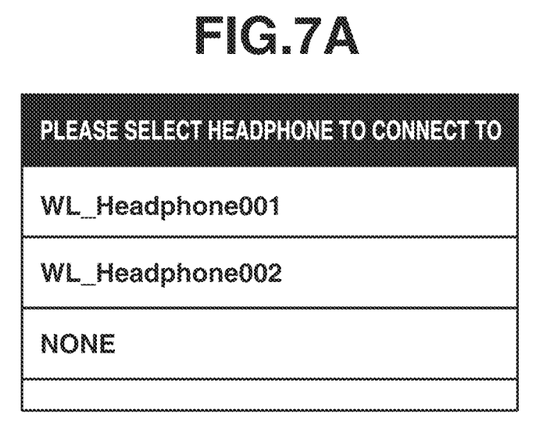
FIG. 7A illustrates an example of a screen that displays a result of a search for a wireless headphone that is unpaired with the digital camera according to the second exemplary embodiment.

In step S611, the control unit 101 displays a detected headphone list on the display unit 106. For example, as illustrated in FIG. 7A, the control unit 101 displays a wireless headphone identification (ID) contained in the identification information about the wireless headphone on the display unit 106.

Figure 7B:
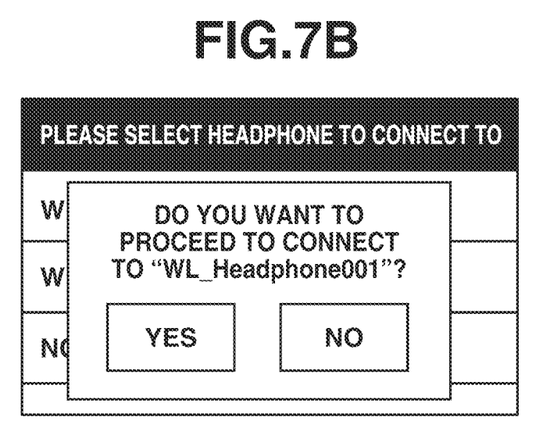
FIG. 7B illustrates an example of a screen that prompts a user to specify whether to establish a wireless connection between the digital camera according to the second exemplary embodiment and an unpaired wireless headphone.

In step S612, the control unit 101 determines whether a wireless headphone is selected. For example, the user selects a wireless headphone to connect to the digital camera 100 using the direction key 105c and the touch panel 105d of the operation unit 105. For example, in a case where the item "WL_Headphone001" is selected by the user, the control unit 101 displays a confirmation screen as illustrated in FIG. 7B. In a case where the item "YES" in FIG. 7B is selected by the user, for example, via the touch panel 105d, the control unit 101 determines that a wireless headphone is selected. In a case where the item "NO" in FIG. 7B is selected by the user, for example, via the touch panel 105d, the control unit 101 displays the screen illustrated in FIG. 7A again and waits until the user selects a wireless headphone to connect to the digital camera 100. In a case where the item "NONE" in FIG. 7A is selected by the user, the control unit 101 determines that no wireless headphone is selected. In a case where the control unit 101 determines that a wireless headphone is selected (YES in step S612), the processing proceeds to step S613. On the other hand, in a case where the control unit 101 determines that a wireless headphone is not selected (NO in step S612), the processing proceeds to step S614. First, the case where the control unit 101 determines that a wireless headphone is selected will be described below.

In step S613, the control unit 101 executes pairing with the wireless headphone selected by the user. If the pairing with the wireless headphone is finished, the process ends.

Next, the case where the control unit 101 determines that a wireless headphone is not detected and the case where the control unit 101 determines that no wireless headphone is selected will be described below.

In step S614, the control unit 101 determines whether the wireless communication function is enabled in response to a change to the silent mode. For example, the control unit 101 determines whether the processing of step S605 is executed. The processing of step S605 is, for example, the processing of turning on the Bluetooth® communication function by the control unit 101 as described above. In a case where the control unit 101 determines that the wireless communication function is not enabled in response to a change to the silent mode (NO in step S614), the process ends. On the other hand, in a case where the control unit 101 determines that the wireless communication function is enabled in response to a change to the silent mode (YES in step S614), the processing proceeds to step S615. The processing in step S614 is similar to the processing in step S410 in FIG. 4.

In step S615, the control unit 101 disables the wireless communication function. For example, the control unit 101 turns off the Bluetooth® wireless communication function. In this way, the control unit 101 reduces the time during which the power consumption increases because the wireless communication function is continuously enabled when the wireless headphone is not used. The processing in step S615 is similar to the processing in step S411 in FIG. 4.

An example of a process of wirelessly connecting the digital camera 100 to an external speaker according to the present exemplary embodiment has been described above. With the process, the user can wirelessly connect a wireless headphone to the digital camera 100 by changing the digital camera 100 to the silent mode.

A process of disconnecting the wireless connection with the external speaker is similar to that in the first exemplary embodiment, so that description thereof is omitted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120045, filed Jun. 27, 2019, which is hereby incorporated by reference herein in its entirety.

What is claimed is:

1. A communication apparatus comprising:
   a wireless communication unit configured to wirelessly communicate with an external apparatus;
   a speaker;
   a memory; and
   a control unit,
   wherein, in a case where an operation is executed to change the communication apparatus to a predetermined mode in which a sound is not output from the speaker, the control unit is configured to perform control such that the communication apparatus is changed to the predetermined mode,
   wherein, in a case where identification information about the external apparatus is stored in the memory, the control unit is configured to enable a wireless communication function in response to the execution of the operation to change the communication apparatus to the predetermined mode,
   wherein, in a case where the identification information about the external apparatus is not stored in the memory, even if the operation to change the communication apparatus to the predetermined mode is executed, the control unit is configured not to enable the wireless communication function,
   wherein in a case where the wireless communication function is enabled, the control unit is configured to control the wireless communication unit to establish a wireless connection between the communication apparatus and the external apparatus, and
   wherein even in a case where the wireless communication function is enabled, if the external apparatus does not include a speaker, the control unit is configured not to establish a wireless connection between the communication apparatus and the external apparatus.

2. The communication apparatus according to claim 1, wherein the external apparatus includes a speaker.

3. The communication apparatus according to claim 1, wherein in a case where the communication apparatus is changed to the predetermined mode, the control unit is configured to disable a function of outputting a sound from the speaker.

4. The communication apparatus according to claim 1, wherein in the case where the operation to change to the predetermined mode is executed, the control unit is configured to control an operation unit of the communication apparatus such that an operation of outputting a sound from the speaker is not received until the control unit determines whether a wireless connection is established between the communication apparatus and the external apparatus.

5. The communication apparatus according to claim 1, wherein in a case where the wireless communication function is enabled in response to execution of the operation to change to the predetermined mode, the control unit is configured to control the wireless communication unit such that a wireless connection established between the communication apparatus and the external apparatus after the operation to change to the predetermined mode is executed is disconnected in response to execution of the operation to change to the predetermined mode.

6. The communication apparatus according to claim 1, wherein in a case where a volume of a sound that is output from the speaker is changed to a predetermined value, the control unit is configured to enable the wireless communication function.

7. The communication apparatus according to claim 1, further comprising a detection unit configured to detect whether the external apparatus and the communication apparatus are wire-connected,
wherein, in a case where the external apparatus and the communication apparatus are wire-connected, if the operation to change to the predetermined mode is executed, the control unit is configured to control the wireless communication unit such that the communication apparatus and the external apparatus are not wirelessly connected, and
wherein, in a case where the external apparatus and the communication apparatus are not wire-connected, if the operation to change to the predetermined mode is executed, the control unit is configured to control the wireless communication unit such that the communication apparatus and the external apparatus are wirelessly connected.

8. The communication apparatus according to claim 1, wherein the predetermined mode corresponds to a silent mode.

9. The communication apparatus according to claim 1, further comprising an image capturing unit including a mechanical shutter,
wherein in the predetermined mode, the image capturing unit is configured to capture an image without using the mechanical shutter.

10. The communication apparatus according to claim 1, wherein the wireless communication unit is configured to wirelessly communicate with the external apparatus based on a Bluetooth® standard.

11. A method of controlling a communication apparatus comprising:
a wireless communication unit configured to wirelessly communicate with an external apparatus;
a speaker;
a memory; and
a control unit,
the method comprising:
performing control such that, in a case where an operation is executed to change the communication apparatus to a predetermined mode in which a sound is not output from the speaker of the communication apparatus, the communication apparatus is changed to the predetermined mode;
enabling a wireless communication function in response to the execution of the operation to change the communication apparatus to the predetermined mode, in a case where identification information about an external apparatus is stored in the memory;
in a case where the identification information about the external apparatus is not stored in the memory, even if the operation to change the communication apparatus to the predetermined mode is executed, not enabling the wireless communication function;
in a case where the wireless communication function is enabled, establishing a wireless connection between the communication apparatus and the external apparatus; and
even in a case where the wireless communication function is enabled, if the external apparatus does not include a speaker, not establishing a wireless connection between the communication apparatus and the external apparatus.

12. A non-transitory computer-readable storage medium that stores a program for causing a communication apparatus comprising a wireless communication unit configured to wirelessly communicate with an external apparatus, a speaker, a memory, and a control unit to execute a method, wherein the method comprises:
performing control such that in a case where an operation is executed to change the communication apparatus to a predetermined mode in which a sound is not output from the speaker of the communication apparatus, the communication apparatus is changed to the predetermined mode;
enabling a wireless communication function in response to the execution of the operation to change the communication apparatus to the predetermined mode in a case where identification information about an external apparatus is stored in the memory;
in a case where the identification information about the external apparatus is not stored in the memory, even if the operation to change the communication apparatus to the predetermined mode is executed, not enabling the wireless communication function;
in a case where the wireless communication function is enabled, establishing a wireless connection between the communication apparatus and the external apparatus; and
even in a case where the wireless communication function is enabled, if the external apparatus does not include a speaker, not establishing a wireless connection between the communication apparatus and the external apparatus.

13. A communication apparatus comprising:
a wireless communication unit configured to wirelessly communicate with an external apparatus;
a speaker; and
a control unit,
wherein the control unit is configured to enable a wireless communication function in response to execution of an operation to change to a predetermined mode in which a sound is not output from the speaker,
wherein in a case where the wireless communication function is enabled in response to the execution of the operation to change to the predetermined mode, the control unit is configured to control the wireless communication unit such that a wireless connection is established between the communication apparatus and the external apparatus,
wherein in a case where the control unit determines that a wireless connection is not established between the communication apparatus and the external apparatus, the control unit is configured to disable the wireless communication function enabled in response to the execution of the operation to change to the predetermined mode,
wherein in a case where the wireless communication function is enabled, the control unit is configured to control the wireless communication unit to establish a wireless connection between the communication apparatus and the external apparatus, and wherein even in a case where the wireless communication function is enabled, if the external apparatus does not include a speaker, the control unit is configured not to establish a wireless connection between the communication apparatus and the external apparatus.

14. The communication apparatus according to claim 13, wherein in a case where the communication apparatus is changed to the predetermined mode, the control unit is configured to disable a function of outputting a sound from the speaker.

15. The communication apparatus according to claim 13, wherein in a case where the operation to change to the predetermined mode is executed, the control unit is configured to control an operation unit of the communication apparatus such that an operation of outputting a sound from the speaker is not received until the control unit determines whether a wireless connection is established between the communication apparatus and the external apparatus.

16. A method of controlling a communication apparatus comprising a wireless communication unit configured to wirelessly communicate with an external apparatus, a speaker; a memory; and a control unit; the method comprising:

enabling a wireless communication function in response to execution of an operation to change to a predetermined mode in which a sound is not output from the speaker of the communication apparatus;

controlling a wireless communication unit of the communication apparatus such that a wireless connection is established between the communication apparatus and the external apparatus in a case where the wireless communication function is enabled in response to the execution of the operation to change to the predetermined mode;

disabling the wireless communication function enabled in response to the execution of the operation to change to the predetermined mode in a case where the control unit of the communication apparatus determines that a wireless connection is not established between the communication apparatus and the external apparatus;

in a case where the wireless communication function is enabled, establishing a wireless connection between the communication apparatus and the external apparatus; and even in a case where the wireless communication function is enabled, if the external apparatus does not include a speaker, not establishing a wireless connection between the communication apparatus and the external apparatus.

17. A non-transitory computer-readable storage medium that stores a program for causing a communication apparatus comprising a wireless communication unit configured to wirelessly communicate with an external apparatus, a speaker; a memory; and a control unit to execute a method, wherein the method comprises:

enabling a wireless communication function in response to execution of an operation to change to a predetermined mode in which a sound is not output from the speaker of the communication apparatus;

controlling a wireless communication unit of the communication apparatus such that a wireless connection is established between the communication apparatus and the external apparatus in a case where the wireless communication function is enabled in response to the execution of the operation to change to the predetermined mode;

disabling the wireless communication function enabled in response to the execution of the operation to change to the predetermined mode in a case where the control unit of the communication apparatus determines that a wireless connection is not established between the communication apparatus and the external apparatus;

in a case where the wireless communication function is enabled, establishing a wireless connection between the communication apparatus and the external apparatus; and even in a case where the wireless communication function is enabled, if the external apparatus does not include a speaker, not establishing a wireless connection between the communication apparatus and the external apparatus.

* * * * *